(12) United States Patent
Goodall et al.

(10) Patent No.: US 9,593,952 B2
(45) Date of Patent: Mar. 14, 2017

(54) SYSTEM AND METHOD FOR INTELLIGENT TUNING OF KALMAN FILTERS FOR INS/GPS NAVIGATION APPLICATIONS

(75) Inventors: Chris Goodall, Calgary (CA); Naser El-Sheimy, Calgary (CA)

(73) Assignee: Trusted Positioning, Inc., Calgary (CA)

( * ) Notice: Subject to any disclaimer, the term of this patent is extended or adjusted under 35 U.S.C. 154(b) by 1195 days.

(21) Appl. No.: 12/246,126

(22) Filed: Oct. 6, 2008

(65) Prior Publication Data

US 2009/0132164 A1 May 21, 2009

Related U.S. Application Data

(60) Provisional application No. 60/997,928, filed on Oct. 4, 2007.

(51) Int. Cl.
*G01C 21/00* (2006.01)
*G01C 21/16* (2006.01)
*G01S 19/47* (2010.01)

(52) U.S. Cl.
CPC .......... *G01C 21/165* (2013.01); *G01S 19/47* (2013.01)

(58) Field of Classification Search
CPC .................. G01S 19/37; H03J 7/04
USPC ........................................... 701/200
See application file for complete search history.

(56) References Cited

U.S. PATENT DOCUMENTS

| | | | |
|---|---|---|---|
| 6,453,238 B1* | 9/2002 | Brodie | G01C 21/165 340/988 |
| 7,328,196 B2 | 2/2008 | Peters | |
| 2005/0149227 A1* | 7/2005 | Peters, II | B25J 9/161 700/245 |
| 2005/0243005 A1* | 11/2005 | Rafi | H01Q 9/0442 343/767 |
| 2008/0211715 A1* | 9/2008 | Feintuch et al. | 342/357.12 |

\* cited by examiner

*Primary Examiner* — Reginald R Reyes

(57) ABSTRACT

Disclosed is a reinforcement learning technique for online tuning of integration filters of navigation systems needing a priori tuning parameters, such as Kalman Filters and the like. The method includes receiving GNSS measurements from the GNSS unit of the navigation system; and IMU measurements from IMU of the navigation system. The method further includes providing a priori tuning parameters to tune the integration filter of the navigation system. The method further includes processing the GNSS and IMU measurements using the tuned integration filter to compute a position estimate and updating the a priori tuning parameters based on the computer position estimate.

38 Claims, 3 Drawing Sheets

SYSTEM AND METHOD FOR INTELLIGENT TUNING OF KALMAN FILTERS FOR INS/GPS NAVIGATION APPLICATIONS

CROSS REFERENCE TO RELATED APPLICATIONS

This application claim benefit of the U.S. Provisional Application Ser. No. 60/997,928, filed on Oct. 4, 2007, which is incorporated by referenced herein.

TECHNICAL FIELD

The present application relates generally to the field of signal processing and more particularly to intelligent tuning of integration filters for INS/GPS navigation applications.

BACKGROUND

The demand for civil navigation systems in harsh environments has been growing over the last several years. The Global Positioning System (GPS) has been the backbone of most current navigation systems, but its usefulness in downtown urban environments or heavily treed terrain is limited due to signal blockages and other signal propagation impairments. To help bridge these signal gaps inertial navigation systems (INS) have been used. For civil applications, INS typically use Micro-Electro-Mechanical Systems (MEMS) Inertial Measurement Units (IMU) due to cost, size and regulatory restrictions of higher grade inertial units. An integrated INS/GPS system can provide a continuous navigation solution regardless of the environment.

The integration filters, such as Kalman Filters, are typically used for combining GPS and INS measurements. The Kalman Filter is a minimum mean squared error estimation tool that is the standard for multi-sensor integration. Kalman Filter, regardless of its exact implementation, is generally considered optimal if certain a priori error statistics are given to the algorithm. These parameters are typically developed by the manufacturer or designer of the sensors, but these values are often very general, especially for low cost MEMS IMUs. In such cases, it is often too costly for either the manufacturer or designer to fine tune individual sensors, and thus less than optimal filter tuning parameters are used. Accordingly, there is a need for an efficient and cost-effective mechanism for tuning integration filters for INS/GPS systems.

Overview

Disclosed is a Reinforcement Learning (RL) technique for tuning integration filters of navigation systems needing a priori tuning parameters. The RL technique can start from general tuning parameters or from those of a previously tuned navigation system. This technique can be applied on-line as navigation data is collected from various INS/GPS navigation systems to further update the a priori parameters for the integration filter. The RL technique allows the manufacturer or designer to avoid tuning individual filters before deployment and would enable individual INS/GPS units towards a better navigation solution through use of optimal parameters. This technique not only improves the accuracy of the solution, but also the time to tune the filter which can be a very time consuming task if performed manually. Other advantages of the disclosed technique will be apparent to those of skill in the art.

In one example embodiment, disclosed is a method for online tuning an integration filter of a navigation system having a global navigation satellite system (GNSS) unit and inertial measurement unit (IMU). The method includes receiving GNSS measurements from the GNSS unit of the navigation system and IMU measurements from the IMU of the navigation system; providing a priori tuning parameters to the integration filter of the navigation system; tuning the integration filter using the provided a priori tuning parameters; processing the GNSS and IMU measurements using the tuned integration filter to compute a navigation estimate comprising one or more of position, velocity and attitude; updating the a priori tuning parameters based on the computed navigation estimate; and repeating all of the above steps using the updated a priori tuning parameters.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DETAILED DESCRIPTION OF EXAMPLE EMBODIMENTS

The intelligent tuning techniques disclosed herein will be described in connection with Kalman Filters, which are commonly used to combine GPS and INS measurements in navigation applications. The technique may apply to various types of Kalman Filters, such including but not limited to the Linearized Kalman Filter (LKF), the Extended Kalman Filter (EKF) and the Unscented Kalman Filter (UKF). However, it will be apparent to those of ordinary skill in the art that in various embodiments the disclosed intelligent tuning technique may be used to tune particle filters and any other integration filters that require a priori tuning parameters; any integration technique that requires a priori information and outputs state estimates in the form of positions can be tuned using the intelligent RL algorithm. Likewise, the disclosed tuning technique is not limited to the GPS applications, but can be used for other types of global navigation satellite system (GNSS) like GLONASS and Gallileo, or other types of absolute wireless location methods that uses RF signals.

Figure 1:
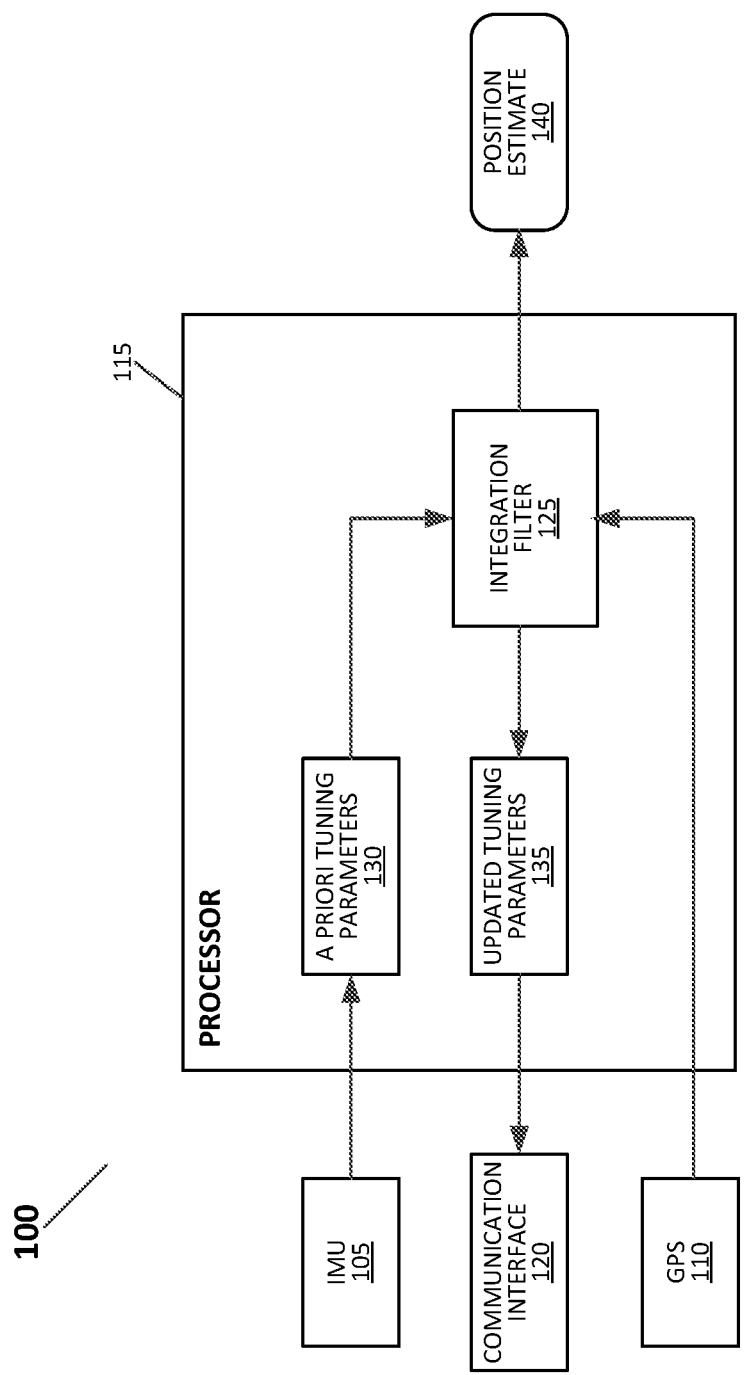
FIG. 1 is a block diagram of one example embodiment of a GPS/INS system.

The operating principle of a general Kalman Filter will be described first with reference to FIG. 1, which depicts an exemplary GPS/INS system. In one example embodiment, Kalman Filter 115 may be implemented as a software executable by a general purpose processor 115. The filter 115 combines measurements from GPS 110 with those of a MEMS IMUs 105 using certain a priori statistical information 130 and various error parameters 135 to compute a position estimate 140. The filter 115 may require knowledge of the system and measurement dynamics as well as a statistical description of the system noises, measurement errors, uncertainty in the dynamic models and other parameters. This may include the noise characteristics of both the INS and GPS updates. The filter 115 then takes several assumptions, such as white noise behavior and Gauss-Markov properties, to weigh the measurements optimally in terms of minimum squared error. In one example embodiment, the filter 115 is configured to output updated tuning parameters 135, which may be used for further tuning of the integration filter 125. The updated tuning information 135 may also be transferred to a communication interface 120, such as a network interface or serial bus to be used for tuning of other navigation systems.

The Kalman Filter may use various tuning parameters. For example, the EKF used for GPS/INS integration may contain 21 error states: three states each for the positions, the velocities, the attitudes, the accelerometer biases, the accelerometer scale factors, the gyro biases and the gyro scale factors.

If the EKF estimation were perfect then the position errors would roughly follow a quadratic drift with time due to integration of time correlated stochastic sensor errors at each epoch. Since it is impossible to predict random errors at an individual epoch, this would be considered the ideal state when navigating with inertial sensors. In practical applications, several factors prevent this optimal situation when using a Kalman Filter.

Since the EKF requires a priori knowledge, in the form of statistical tuning parameters, its performance can vary. For example, poor initial estimates of the MEMS noise levels can greatly affect the drift rate experienced during GPS signal outages due to accumulation of errors from the innovation sequence. Proper tuning 120 of the filter 115 may be analyzed during periods of GPS signal outages. During these times, the positional errors 125 accumulate due to integrated inertial errors. Therefore, if not properly tuned, the filter position errors can grow more rapidly with time.

To overcome these problems, a reinforced learning (RL) technique may be used to tune Kalman Filters in accordance with one example embodiment. The RL begins by forming a model from trial and error testing of parameters and comparing their performance during simulated GPS signal outages. GPS signal outages are used because the drift experienced during a certain period of time without GPS is a strong indicator of the tuning performance of the filter, and this becomes more apparent with longer outages. In this way, as the user navigates, the data can be re-processed with intentionally introduced GPS outages to monitor the effectiveness of the current tuning parameters. Finally, the algorithm continues to explore states outside the developed model and this enables the tuning strategy to adapt to potentially changing environments or dynamics.

As reinforcement learning techniques tune a Kalman Filter, the emphasis is to slowly converge to the correct parameters as the unit is used. As the user navigates, data can be used to test past statistical hypotheses and adapt them as needed. Simulated GPS signal outages can be performed on-line using two separate filters: a simulation filter and a navigation filter. The simulation filter can be compared to the navigation filter and used to test the accumulation of inertial errors during Kalman Filter prediction mode. This creates a divergence of the filter estimates which can be used as an indicator of filter performance. In one example embodiment, reinforcement learning operates using statistical dynamic programming combined with trial and error testing, making it useful for off-line tuning which does not have to be performed by the designer before releasing the system.

The system can simply start from general tuning parameters which are then fine tuned by the knowledge accumulated during actual navigation. Results will largely depend on the starting parameters. If the initial tuning parameters for the Q and R matrices are very close to optimal and do not change over time then no improvement would be expected. But for most MEMS sensors coming off the assembly line there can be large variances, leaving plenty of room for improvement using reinforcement learning. This variance of individual tuning parameters can lead to very significant differences in navigation performance. It is the goal of the reinforcement learning to fine tune the Kalman filter a priori parameters so as to minimize this navigation accuracy discrepancy between sensors.

In the case of MEMS sensors, the tuning of one sensor can be used to aid in the tuning of other similar sensors, thus speeding up the learning process for future sensors. This would be especially useful for MEMS which are manufactured in bulk (thousands to millions), with each individual sensor being slightly different from the others. Fortunately, the tuning of these sensors are often quite similar, even though the statistics might be slightly different, so applying a tuning strategy learned from another sensor would result in faster convergence to optimal parameters.

More specifically, the reinforcement learning involves learning what to do in certain situations, i.e. mapping correct actions to situations. Its use in Kalman filter tuning is beneficial in helping the system learn how to properly tune the filter, and extend this information to similar integrated systems; especially in the case of MEMS systems. Even with the traditional approach there are many assumptions that are taken such as the order of tuning and the size of discrete steps taken. Furthermore, the curse of dimensionality prevents optimal use of an exhaustive search method.

As an example of an exhaustive search, consider the case of tuning 8 parameters, each having 5 discrete steps. The number of iterations to fully explore all combinations would be 390,525. If we wanted to generate simulated GPS outages using a forward KF on real navigation data that took 1 minute to process then this iterative tuning would take over 271 days to complete. Of course, in real applications this tuning may be significantly reduced due to the intelligent input by the designer. In the case of RL, it is this intelligent tuning that is trying to be replicated in an automatic and more optimal fashion that can then be extended to additional sensors for faster tuning. One example embodiment of tuning technique is shown in FIG. 2.

Figure 2:
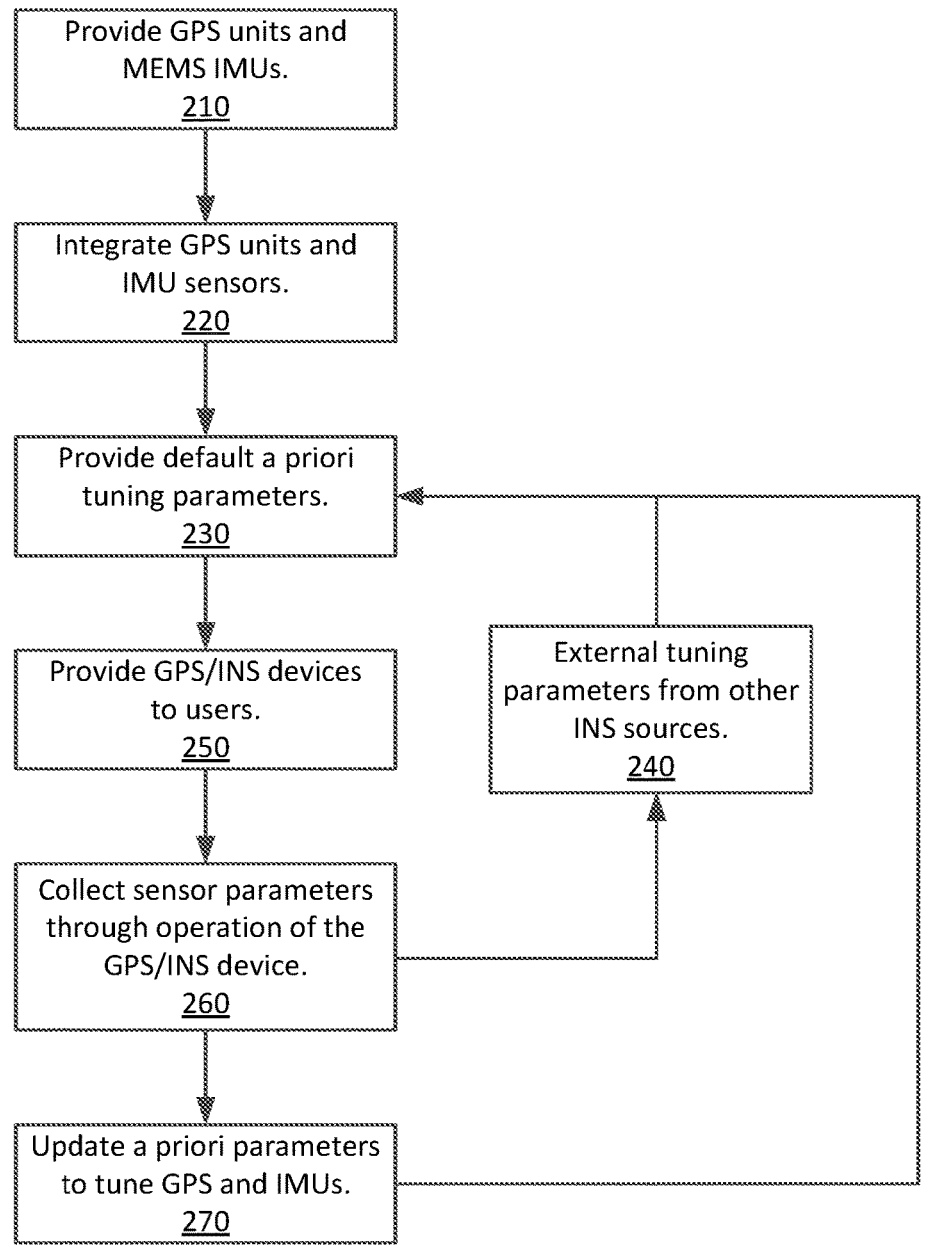
FIG. 2 is a flow diagram of one example embodiment of intelligent tuning algorithm.

As depicted in FIG. 2, at step 210, GPS and MEMS IMUs are provided by the manufacturers. At step 220, GPS and IMUs are integrated into a single GPS/INS navigation device. At step 230, the manufacturer loads the GPS/INS device with typical a priori tuning parameters. The provided tuning parameters may include external parameters provided by other users of the GPS/INS devices if available, as shown at step 240. At step 250, GPS/INS devices are provided to the users. The user then operates the GPS/INS device in various navigation applications and collects additional Kalman Filter tuning parameters at step 260. The user may provide the collected external tuning parameters to the sensor manufacturer, as shown in step 240. At step 270, the collected external tuning parameters data is used to tune newly manufactured M-EMS IMUs and various embedded INS systems.

The intelligent Kalman Filter tuning technique disclosed herein may be implemented as a software solution which can be used for a variety of Kalman filter configurations, such as loosely coupled, tightly coupled, extended, unscented and particle filters. The algorithm itself can also be extended to hardware applications for real-time use. The primary purpose of the system is to tune the a priori parameters of a Kalman filter online as the owner of the integrated system uses it for navigational purposes. The software that implements methods disclosed herein may be developed in any post-processing or real-time programming environment so that it can be used with a variety of existing Kalman filter software packages. The software is configured to address various tuning issues of a Kalman filter regardless of the filter type or programming environment.

Those of skill in the art will recognize that the methods and systems described herein are not limited to tuning of Kalman filters and may be used to tune other signal processing applications and filters. Likewise, the methods and systems described herein are not limited to INS/GPS navigation applications but can be used in various other applications where Kalman and other types of filters are used.

The proposed tuning method described herein could even be extended to tuning of other intelligent methods that require a priori information to provide state estimates. An example would be online tuning of the number of neurons in the hidden layer of an artificial neural network that estimates positions for an INS/GPS system. It is the relative changes in state performance that is used to adjust any a priori information input into a filtering or weighting method used for integrated multi-sensor navigation devise. The specific implementation of the filtering or weighting method is not important.

The relative state improvements should consider both accuracy and reliability improvements. In terms of accuracy, D can be considered the average of many state drifts. In terms of reliability, if available, P can be considered the filters estimate of D. If both accuracy and reliability are available then the performance measure should be to minimize the combination of raw accuracy and consistency. Consistency is defined as the difference between true accuracy and predicted accuracy (i.e. D-P). The performance measure then becomes, $$\min\left(D + \frac{(D-P)^2}{D+P}\right)$$

Some of the parameter tuning operations may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software. Embodiments of the invention may be provided as a computer program product that may include a machine-readable medium having stored thereon instructions, which may be used to program a computer (or other electronic devices) to perform a process according to the invention. The machine-readable medium may include, but is not limited to, optical disks, CD-ROMs, and magneto-optical disks, ROMs, RAMs, EPROMs, EEPROMs, magnetic or optical cards, flash memory, or other type of media/machine-readable medium suitable for storing electronic instructions.

Figure 3:
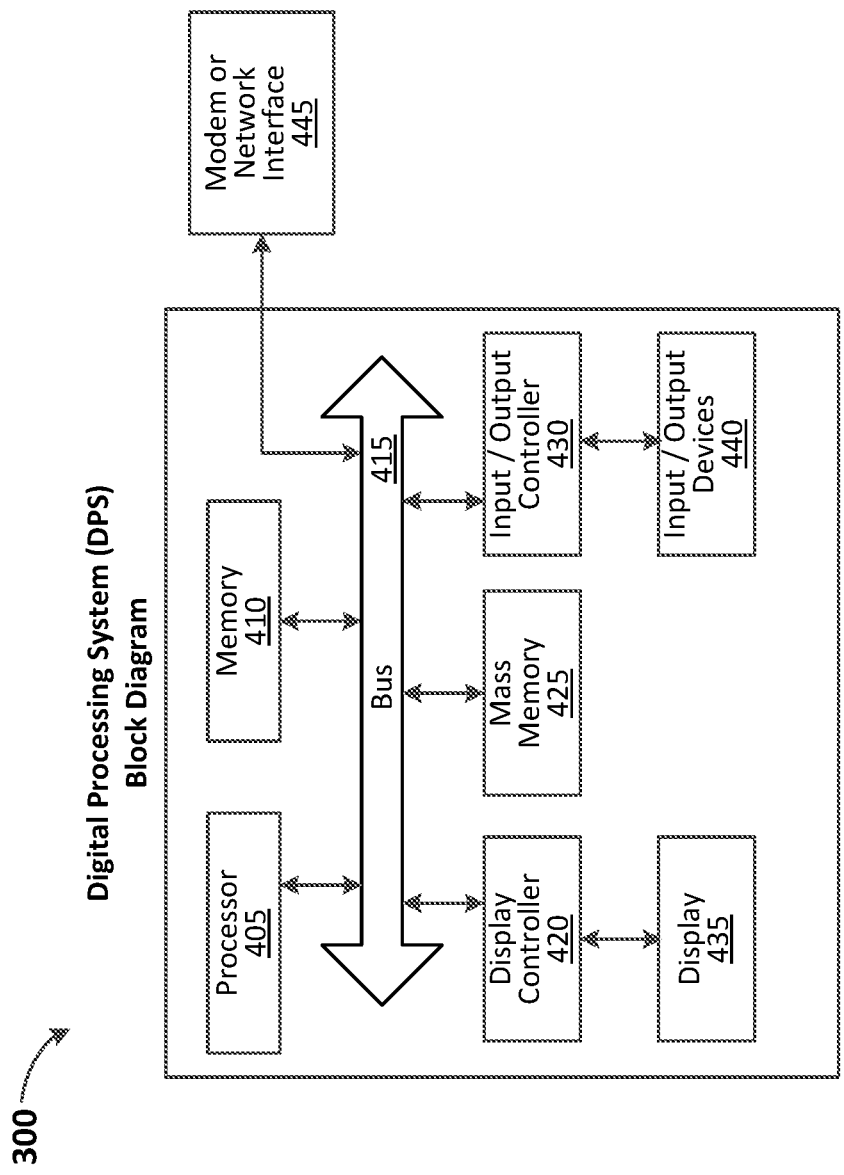
FIG. 3 is a diagram of one example embodiment of a data processing system.

Embodiments of the invention may employ digital processing systems (DPS), such as a personal computer, a notebook computer or other devices having digital processing capabilities to perform integration filter tuning. Such DPSs may be a processor and memory or may be part of a more complex system having additional functionality. FIG. 3 illustrates a functional block diagram of a digital processing system that may be used in accordance with one example embodiment. The processing system 400 may be used to perform one or more functions of a communications signal receiver system in accordance with an embodiment of the invention. The processing system 400 may be interfaced to external systems, such as GPS and other GNSS receivers and MEMS IMUs through a network interface 445 or serial or parallel data bus. The processing system 400 includes a processor 405, which may represent one or more processors and may include one or more conventional types of processors, such as Motorola PowerPC™ processor or Intel Pentium™ processor, etc.

A memory 410 is coupled to the processor 405 by a bus 415. The memory 410 may be a dynamic random access memory (DRAM) and/or may include static RAM (SRAM). The system may also include mass memory 425, which may represent a magnetic, optical, magneto-optical, tape, and/or other type of machine-readable medium/device for storing information. For example, the mass memory 425 may represent a hard disk, a read-only or writeable optical CD, etc. The mass memory 425 (and/or the memory 410) may store data, such as various a priori tuning parameters, that may be processed according to the present invention. For example, the mass memory 425 may contain such parameters as the positions, the velocities, the attitudes, the accelerometer biases, the accelerometer scale factors, the gyro biases and the gyro scale factors.

The bus 415 further couples the processor 405 to a display controller 420, a mass memory 425. The network interface or modem 445, and an input/output (I/O) controller 430. The display controller 420 controls, in a conventional manner, a display 435, which may represent a cathode ray tube (CRT) display, a liquid crystal display (LCD), a plasma display, or other type of display device operable to display navigation information in graphical form. The I/O controller 430 controls I/O device(s) 440, which may include one or more keyboards, mouse/track ball or other pointing devices, magnetic and/or optical disk drives, printers, scanners, digital cameras, microphones, etc.

Those of ordinary skill in the art will realize that the above detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice the present invention. In other instances, well-known computing systems, electric circuits and various data collection devices are shown in block diagram form to avoid obscuring the present invention. In the following description of the embodiments, substantially the same parts are denoted by the same reference numerals.

In the interest of clarity, not all of the features of the implementations described herein are shown and described. It will, of course, be appreciated that in the development of any such actual implementation, numerous implementation-specific devices must be made in order to achieve the developer's specific goals, wherein these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

What is claimed is:

1. A method for tuning an integration filter of a navigation system having a global navigation satellite system (GNSS) unit and an inertial measurement unit (IMU), the method comprising the steps of:
   (a) receiving, at a processor of the navigation system, GNSS measurements from the GNSS unit of the navigation system;
   (b) detecting, at the IMU of the navigation system, IMU measurements;
   (c) receiving, at the processor, the IMU measurements from the IMU of the navigation system;
   (d) providing filter parameters to the integration filter of the navigation system, wherein the filter parameters are parameters of the system and measurement models of the integration filter;
   (e) fine tuning the filter parameters of the integration filter through:
      (i) processing, by the processor, the GNSS and IMU measurements with the integration filter using the filter parameters to compute a navigation estimate comprising one or more of position, velocity and attitude;
      (ii) updating, by the processor, the fine-tuned filter parameters based on the computed navigation estimate using a reinforcement learning technique;
   (f) repeating all of the above steps (a)-(e) using the updated fine-tuned filter parameters; and
   (g) using the fine-tuned filter parameters in the integration filter to obtain a navigation estimate.

2. The method of claim 1, further comprising outputting the updated fine-tuned filter parameters to be used for tuning integration filters of: (i) other navigation systems, or (ii) future sessions of the same navigation system.

3. The method of claim 1, wherein the GNSS includes one of a GPS, GLONASS, and Galileo.

4. The method of claim 1, wherein the IMU includes a Micro-Electro-Mechanical Systems (MEMS) IMU.

5. The method of claim 1, wherein the integration filter includes a minimum mean squared error recursive estimator.

6. The method of claim 1, wherein the integration filter includes one of a Kalman Filter, a Linearized Kalman Filter (LKF), an Extended Kalman Filter (EKF), a Unscented Kalman Filter (UKF), a particle filter, a least squares filter, or an intelligent/learning filter.

7. The method of claim 1, wherein the filter parameters include one or more of the inertial or GNSS stochastic or deterministic error states.

8. The method of claim 1, wherein the fine tuning of the filter parameters comprises using knowledge accumulated during actual navigation.

9. The method of claim 1, wherein the step of updating, by the processor, the fine-tuned filter parameters based on the computed navigation estimate using reinforcement learning techniques further comprises the steps of:
   forming a model from trial and error testing of the parameters; and
   comparing performance of the parameters during simulated Global Positioning System (GPS) signal outages by intentionally introducing GPS signal outages.

10. The method of claim 1, further comprising the step of measuring performance of the integration filter using an algorithm comprising a function of accuracy and reliability of the integration filter.

11. The method of claim 10, further comprising the step of minimizing a difference between true accuracy and predicted accuracy of the integration filter.

12. The method of claim 1, wherein the fine tuning of the filter parameters of the integration filter further comprises:
   (i) intentionally introducing simulated signal outages in the GNSS measurements;
   (ii) processing the GNSS measurements with the simulated signal outages and the IMU measurements with the integration filter using the filter parameters to compute the navigation estimate comprising one or more of position, velocity and attitude;
   (iii) comparing the computed navigation estimate to a reference navigation solution during the GNSS simulated signal outages; and
   (iv) updating the fine-tuned filter parameters based on the comparison of the computed navigation estimate and the reference navigation solution using the reinforcement learning technique.

13. The method of claim 12, wherein the reference navigation solution is from one of the following:
   (i) the GNSS measurements without the simulated outages;
   (ii) an integrated navigation solution by processing the GNSS measurements without the simulated outages and the IMU measurements; or
   (iii) another processed reference solution.

14. A navigation system comprising:
   a global navigation satellite system (GNSS) unit;
   an inertial measurement unit (IMU) for detecting IMU measurements:
   an integration filter for combining GNSS measurements and the IMU measurements;
   a memory for storing filter parameters to the integration filter; a processor operable to
   fine tune the filter parameters of the integration filter, wherein the filter parameters are parameters of the system and measurement models of the integration filter, therein the fine tuning is through
   processing the GNSS and IMU measurements with the integration filter using the filter parameters to compute a navigation estimate comprising one or more of position, velocity and attitude; and
   updating the fine-tuned filter parameters based on the computed navigation estimate using a reinforcement learning technique; and
   a communication interface for transferring the updated fine-tuned filter parameters to other systems;
   wherein the processor is further operable to use the fine-tuned filter parameters in the integration filter to obtain a navigation estimate.

15. The system of claim 14, wherein the GNSS includes one of a GPS, GLONASS, and Galileo.

16. The system of claim 14, wherein the IMU includes a Micro-Electro-Mechanical Systems (MEMS) IMU.

17. The system of claim 14, wherein the integration filter includes a minimum mean squared error recursive estimator.

18. The system of claim 14, wherein the integration filter includes one of a Kalman Filter, a Linearized Kalman Filter (LKF), an Extended Kalman Filter (EKF), a Unscented Kalman Filter (UKF), and a particle filter.

19. The system of claim 14, wherein filter parameters include one or more of the inertial or GNSS stochastic or deterministic error states.

20. The system of claim 14, wherein the processor is further operable to fine tune the filter parameters using knowledge accumulated during actual navigation.

21. The system of claim 14, wherein the processor is further operable to:

form a model from trial and error testing of the parameters; and compare performance of the parameters during simulated Global Positioning System (GPS) signal outages by intentionally introducing GPS signal outages.

22. The system of claim 14, wherein the processor is further operable to measure performance of the integration filter using an algorithm comprising a function of accuracy and reliability of the integration filter.

23. The system of claim 22, wherein the processor is further operable to minimize a difference between true accuracy and predicted accuracy of the integration filter.

24. The system of claim 14, wherein the processor is further operable to fine tune the filter parameters of the integration filter through:
   (i) intentionally introducing simulated signal outages in the GNSS measurements;
   (ii) processing the GNSS measurements with the simulated signal outages and the IMU measurements with the integration filter using the filter parameters to compute a navigation estimate comprising one or more of position, velocity and attitude;
   (iii) comparing the computed navigation estimate to a reference navigation solution during the GNSS simulated signal outages; and
   (iv) updating the fine-tuned filter parameters based on the comparison of the computed navigation estimate and the reference navigation solution using the reinforcement learning technique.

25. The system of claim 24, wherein the reference navigation solution is from one of the following:
   (i) the GNSS measurements without the simulated outages;
   (ii) an integrated navigation solution by processing the GNSS measurements without the simulated outages and the IMU measurements; or
   (iii) another processed reference solution.

26. A non-transitory computer-readable medium comprising computer-executable instructions for tuning an integration filter of a navigation system having a global navigation satellite system (GNSS) unit and an inertial measurement unit (IMU), the computer-executable instructions comprising:
   (a) instructions for receiving, at a processor of the navigation system, GNSS measurements from the GNSS unit of the navigation system;
   (b) instruction for detecting, at the IMU of the navigation system, IMU measurements;
   (c) instructions for receiving, at the processor, the IMU measurements from the IMU of the navigation system;
   (d) instructions for providing filter parameters to the integration filter of the navigation system, wherein the filter parameters are parameters of the system and measurement models of the integration filter;
   (e) instructions for fine tuning the filter parameters of the integration filter through:
      (i) instructions for processing, by the processor, the GNSS and IMU measurements with the integration filter using the filter parameters to compute a navigation estimate comprising one or more of position, velocity and attitude; and
      (ii) instructions for updating, by the processor, the fine-tuned filter parameters based on the computed navigation estimate using a reinforcement learning technique;
   (f) instructions for repeating all of the above instructions using the updated fine-tuned filter parameters; and
   (g) instructions for using the fine-tuned filter parameters in the integration filter to obtain a navigation estimate.

27. The non-transitory computer-readable medium of claim 26, further comprising instructions for outputting the updated fine-tuned filter parameters to be used for tuning integration filters of: (i) other navigation systems, or (ii) future sessions of the same navigation system.

28. The non-transitory computer-readable medium of claim 26, wherein the GNSS includes one of a GPS, GLONASS, and Galileo.

29. The non-transitory computer-readable medium of claim 26, wherein the IMU includes a Micro-Electro-Mechanical Systems (MEMS) IMU.

30. The non-transitory computer-readable medium of claim 26, wherein the integration filter includes a minimum mean squared error recursive estimator.

31. The non-transitory computer-readable medium of claim 26, wherein the integration filter includes one of a Kalman Filter, a Linearized Kalman Filter (LKF), an Extended Kalman Filter (EKF), an Unscented Kalman Filter (UKF), a particle filter, a least squares filter, or an intelligent/learning filter.

32. The non-transitory computer-readable medium of claim 26, wherein the filter parameters include one or more of the inertial or GNSS stochastic or deterministic error states.

33. The non-transitory computer-readable medium of claim 26, wherein the instructions for fine tuning the filter parameters further comprise instructions for fine tuning the parameters using knowledge accumulated during actual navigation.

34. The non-transitory computer-readable medium of claim 26, wherein the instructions for fine tuning the filter parameters further comprise instructions for:
   forming a model from trial and error testing of the parameters; and
   comparing performance of the parameters during simulated Global Positioning System (GPS) signal outages by intentionally introducing GPS signal outages.

35. The non-transitory computer-readable medium of claim 26, further comprising instructions for measuring performance of the integration filter using an algorithm comprising a function of accuracy and reliability of the integration filter.

36. The non-transitory computer-readable medium of claim 35, further comprising instructions for minimizing a difference between true accuracy and predicted accuracy of the integration filter.

37. The non-transitory computer-readable medium of claim 30 further comprising computer-executable instructions for:
   (i) intentionally introducing simulated signal outages in the GNSS measurements;
   (ii) processing the GNSS measurements with the simulated signal outages and the IMU measurements with the integration filter using the filter parameters to compute a navigation estimate comprising one or more of position, velocity, and attitude;
   (iii) comparing the computed navigation estimate to a reference navigation solution during the GNSS simulated signal outages; and
   (iv) updating the fine-tuned filter parameters based on the comparison of the computed navigation estimate and the reference navigation solution using the reinforcement learning technique.

38. The non-transitory computer readable medium of claim 37, wherein the reference navigation solution is from one of the following:
  (i) the GNSS measurements without the simulated outages;
  (ii) an integrated navigation solution by processing the GNSS measurements without the simulated outages and the IMU measurements; or
  (iii) another processed reference solution.

* * * * *